Jan. 8, 1963 L. E. PONSY 3,072,761
ELECTRICAL SWITCHING DEVICES
Filed July 6, 1959 7 Sheets-Sheet 1

INVENTOR
Louis Emile Ponsy
BY
Bailey, Stephens & Huettig
ATTORNEYS

Jan. 8, 1963 L. E. PONSY 3,072,761
ELECTRICAL SWITCHING DEVICES
Filed July 6, 1959 7 Sheets-Sheet 2

INVENTOR
Louis Emile Ponsy
BY
Bailey, Stephens & Huettig
ATTORNEYS

Jan. 8, 1963 L. E. PONSY 3,072,761
ELECTRICAL SWITCHING DEVICES
Filed July 6, 1959 7 Sheets-Sheet 3

INVENTOR
Louis Emile Ponsy
BY
Bailey, Stephens & Huettig
ATTORNEYS

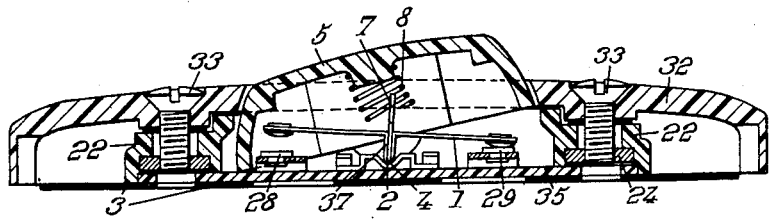
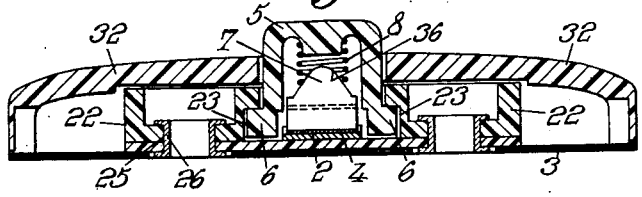
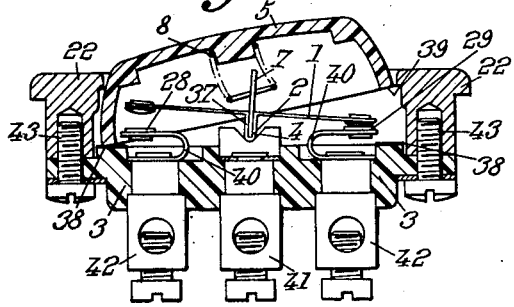
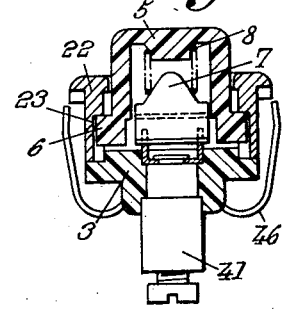
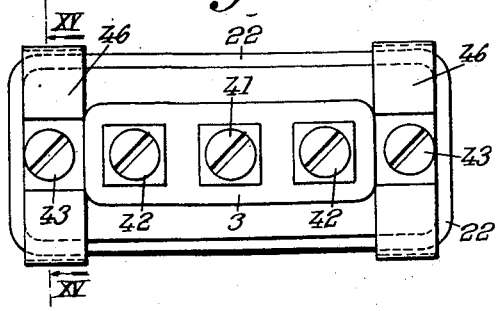
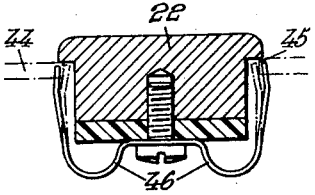
INVENTOR
Louis Emile Ponsy
BY
Bailey, Stephens & Huettig
ATTORNEYS Jan. 8, 1963 L. E. PONSY 3,072,761
ELECTRICAL SWITCHING DEVICES
Filed July 6, 1959 7 Sheets-Sheet 5

INVENTOR
Louis Emile Ponsy
BY
Bailey, Stephens & Huettig
ATTORNEYS

Jan. 8, 1963  L. E. PONSY  3,072,761
ELECTRICAL SWITCHING DEVICES
Filed July 6, 1959  7 Sheets-Sheet 6
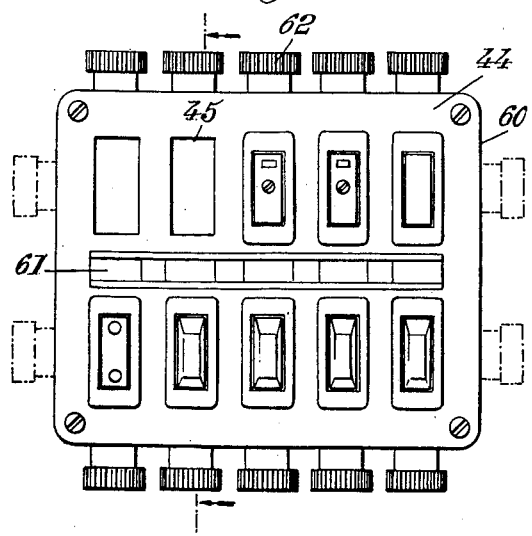
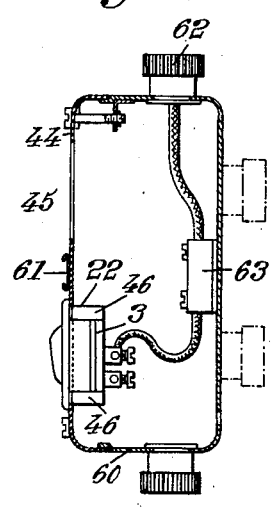
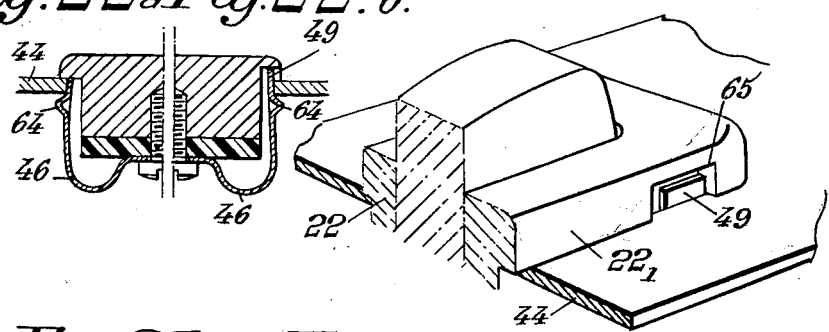
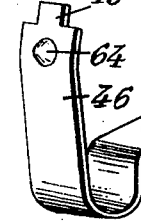
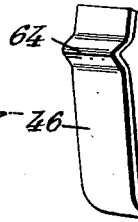
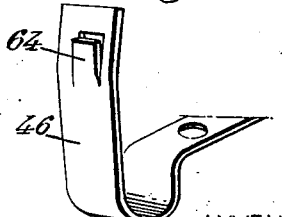
INVENTOR
Louis Emile Ponsy
BY
Bailey, Stephens & Huettig
ATTORNEYS Jan. 8, 1963  L. E. PONSY  3,072,761
ELECTRICAL SWITCHING DEVICES
Filed July 6, 1959  7 Sheets-Sheet 7
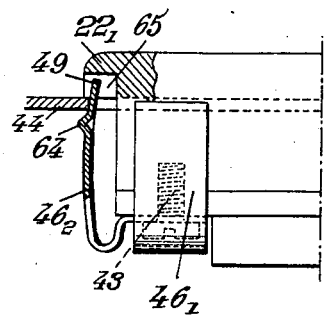
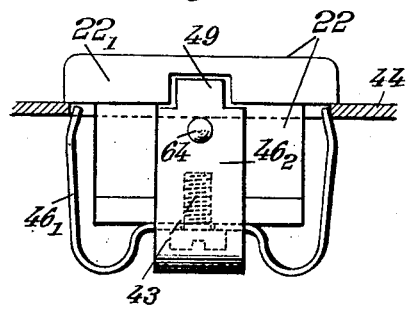
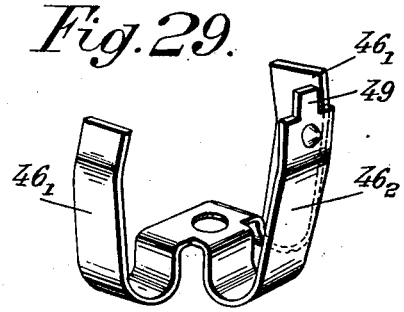
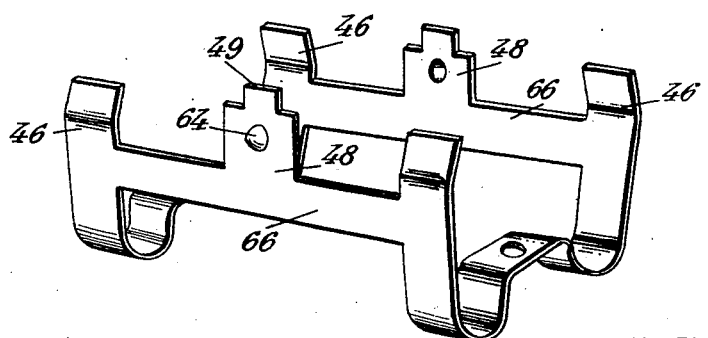
INVENTOR
Louis Emile Ponsy
BY
Bailey, Stephens & Huettig
ATTORNEYS

3,072,761
ELECTRICAL SWITCHING DEVICES
Louis Emile Ponsy, Montmorency, France, assignor to Precision Mecanique Labinal, Saint-Ouen, France, a French society
Filed July 6, 1959, Ser. No. 825,116
Claims priority, application France Dec. 12, 1958
8 Claims. (Cl. 200—67)

The present invention relates to electrical switching devices, more especially of small or medium size, it being well understood that the term "switching device" must be taken in its broadest meaning, that is to say that it applies to devices having movable contacts capable of making or breaking a circuit (circuit breakers) or of substituting a circuit for another one (switches), also to plug and socket devices and, in a general manner, to all devices or apparatus used for similar purposes (pushbuttons, fuze plugs, etc.).

The chief object of my invention is to provide a device of this kind which is better adapted to meet the requirements of practice than those existing up to the present time, in particular concerning simplicity of construction and reduced dimensions, especially reduced thickness.

My invention consists chiefly in providing the devices of the type above referred to with a rocking contact operated by a rocking control member which covers said contact, the rocking contact having its pivot axis located as close as possible to the base plate of the device and the rocking control member, which is pivoted about an axis advantageously very close to the first mentioned axis, cooperating through resilient means with said rocking contact so as to snap it in one direction or the other according to the direction in which said control member is pivoted.

Other features of my invention will become apparent in the course of the following detailed description of some specific embodiments thereof with reference to the appended drawings, given merely by way of example and in which.

Figure 7:
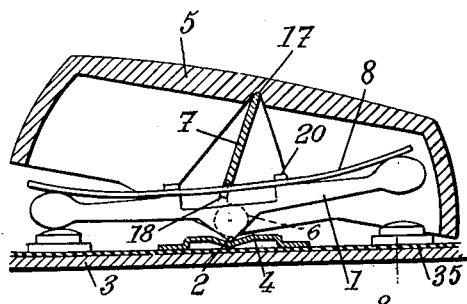
Figure 8:
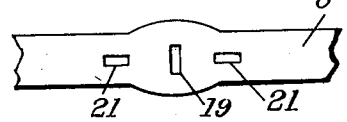

FIG. 8 separately shows a spring plate included in the device of FIG. 7.

Figure 1:
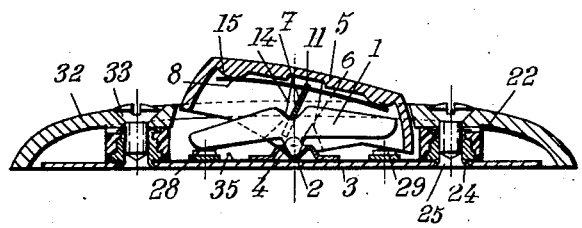
FIG. 1 is a sectional view on the line I—I of FIG. 2 of a switching device made according to the invention.
Figure 9:
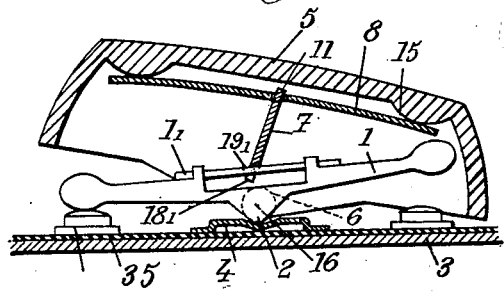

FIG. 9 shows, similarly to FIG. 1, still another embodiment of the invention.

FIGS. 10 and 11 are two sectional views, taken at right angles to each other, of still another embodiment of the invention.

FIG. 12 is a longitudinal sectional view of still another embodiment of the invention.

FIG. 13 is a transverse section corresponding to FIG. 12.

FIG. 14 is a bottom view corresponding to FIGS. 12 and 13.

FIG. 15 is a sectional view on the line XV—XV of FIG. 14.

Figure 16:
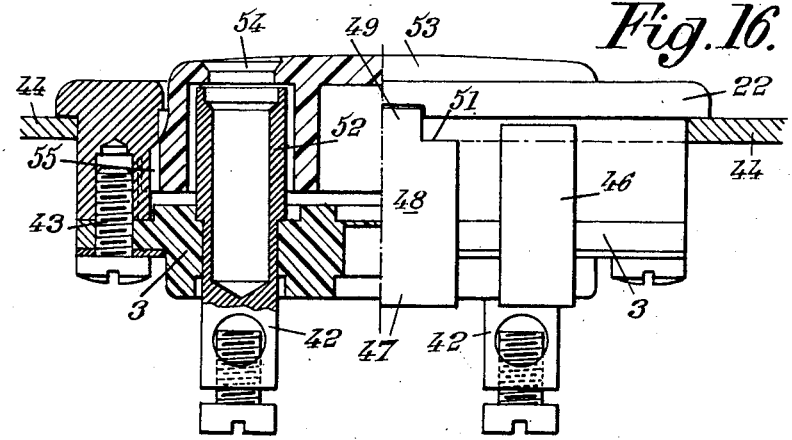

FIG. 16 is a view (one half thereof being in section and the other half in elevation) of a socket device made according to the invention.

Figure 17:
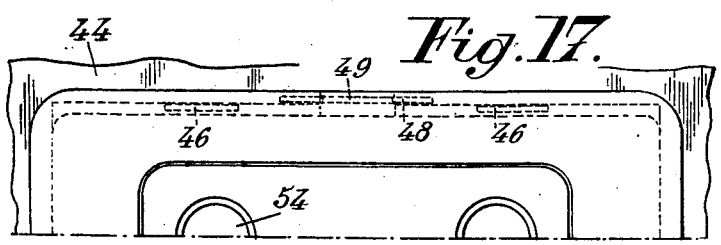

FIG. 17 is a top plan view corresponding to FIG. 16.

Figure 18:
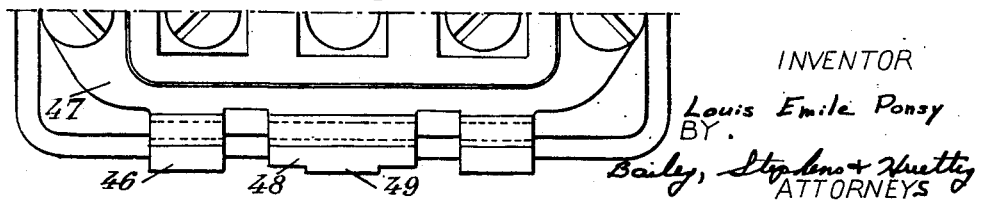

FIG. 18 is a corresponding bottom view.

Figure 19:
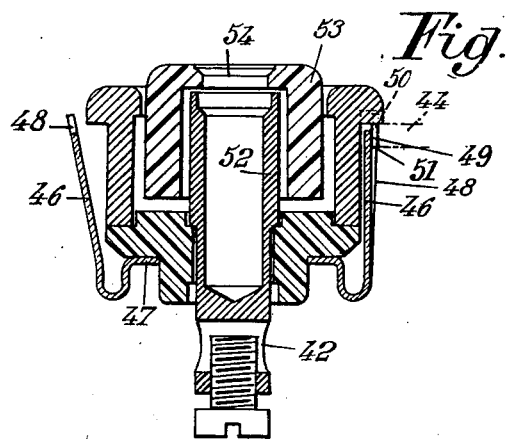

FIG. 19 is a cross-section of the device of FIGS. 16 to 18.

FIGS. 20 and 21 show, respectively in elevational view and in side view, a panel comprising different electrical devices arranged according to the invention.

FIGS. 22a and 22b are two half sections corresponding to two modifications of a device of this kind and of the fixation and locking means thereof, made according to another embodiment of the invention.

FIG. 23 is a part perspective view of a similar device, the fixation and locking means being made according to the modification of FIG. 22b.

FIGS. 24 to 26 show in perspective view, respectively, three different embodiments of spring fixation means to be used according to the invention.

FIGS. 27 and 28 are two views partly in section, respectively at right angles to each other, of a system similar to that of FIGS. 22a, 22b but made according to another embodiment of the invention.

FIG. 29 is a perspective view of the spring used in the device of FIGS. 27 and 28.

FIG. 30 shows separately, in perspective view, a spring for the same purpose made according to a modification.

It is known to make switching devices which include at least one rocking contact piece and a control member capable of snapping this contact in one direction or the other according to the direction in which said control member is moved. But these switching devices are generally of rather important thickness in the direction at right angles to their base plate.

According to the present invention, a switching device of this kind essentially includes, as shown by FIGS. 1 to 15:

At least one rocking contact in the form of a double lever, as shown at 1 on the drawings, this contact having its pivot axis 2 as close as possible to the base plate 3 of the device; in the embodiment shown by the drawings, contact lever 1 is provided with a sharp edge cooperating with a V-shaped bearing carried by a piece 4 resting upon the base plate 3;

A control piece 5, preferably of hollow shape covering said contact lever, pivoted at 6 about an axis which is advantageously as close as possible to the pivot axis of contact member 2;

And connecting means between said control member and said contact lever, so as to urge said contact lever in the downward direction toward the base plate and to cause it to snap into one direction or the other according to the direction in which the control member is itself rotated.

In particular, said connecting means are advantageously constituted by a link such as 7, interposed between the control member and the rocking contact, and further subjected to the action of a spring which tends to apply it against the contact, this spring being constituted for instance:

Either by a resilient plate 8 disposed in particular either at the bottom of the control member, as shown on FIGS. 1 to 6 and 9, or along contact 1, as shown on FIGS. 7 and 8, Or by a helical spring, as shown by FIGS. 10 to 15.

Said link is formed for instance by a suitably cut plate hinged on the corresponding elements at both of its ends (FIGS. 1 to 9) by projections penetrating into apertures provided for this purpose in said elements.

In the embodiment of FIGS. 1 to 5, the end 9 of link 7 cooperating with contact 1 is in the form of a fork the two branches of which extend on the sides of a portion of contact 1 provided with a notch 10. The other end of said link is in the form of a projection 11 engaged in a hole 12 of plate 8. This plate is suitably positioned with respect to control member 5, for instance by means of side extensions 13 guided in lateral grooves 14 of said control member. Abutments 15 are provided in the control member to cooperate with the ends of plate 8 while permitting free deformations thereof.

Figure 6:
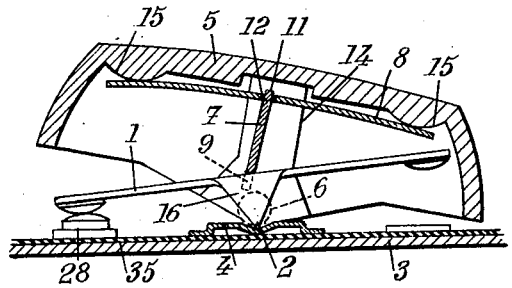
FIGS. 6 and 7 show, similarly to FIG. 1, other modifications of the device according to the invention.

In the modification of FIG. 6, the arrangement is similar but, in this case, the rocking contact 1 is constituted by a piece the central portion of which is bent downwardly so that the ends of said bent portions constitute the sharp edge forming hinge 2.

In the modification of FIGS. 7 and 8, link 7 is pivotally mounted upon the bottom of control member 5, whereas its other end bears upon spring plate 8, for instance through a projection 18 engaged in a hole 19 of said plate. Plate 8, which is carried by rocking contact 1, is positioned with respect thereto by projections 20 thereof engaging into holes 21 of plate 8 (FIG. 8).

In the modification of FIG. 9, link 7 is connected to control member 5 in the same manner as on FIGS. 1 to 6, whereas the other end of said link 7 is provided with a projection $18_1$ engaging a hole $19_1$ of an auxiliary piece $1_1$.

In the embodiments of FIGS. 10-11 and 12-15, the resilient action is exerted by at least one helical spring 8, suitably compressed between the control member and link 7, which is then carried by the rocking contact.

Said link 7, which is fixed at its lower end on said rocking contact, is provided at its opposed end with a thinned portion 36 adapted to engage inside said spring 8.

In this case also, the point of action of the spring being offset with respect to the hinge 2 of contact 1 by a distance corresponding to the active length of the link, the desired snap action is obtained under the effect of the resiliency of the spring.

FIGS. 10 to 15 show a preferred construction of the rocking contact 1. This contact consists of an elongated plate bent at its middle part at 37 so as to form the pivot edge 2 and at the same time to secure link 7 in position, said link being caught between the two faces of the bent portion of contact 1.

The fixed contacts are advantageously constituted by resilient elements 40 (FIGS. 12 and 13), for instance bent in U-shaped fashion, so as to obtain a silent operation of the device.

For the same purpose, packing pieces 38 (FIG. 12) may be provided on the base plate at the place where the edges 39 of the control member could come into contact with said plate.

Whatever be the manner in which the various parts of the device are arranged, I make use, for their assembly, of an arrangement such that, the control member being introduced into a suitable frame through the side thereof intended to come into contact with base plate 3, the fixation of said plate, which carries the rocking contact and the connecting means between the rocking contact and the control member, ensure the final positioning of all the parts.

Figure 3:
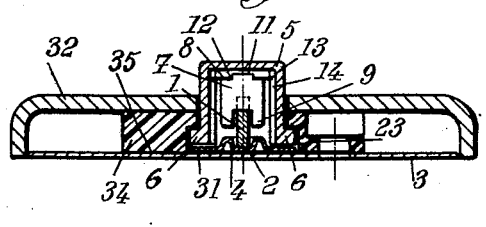
FIG. 3 is a sectional view on the line III—III of FIG. 2.
Figure 4:
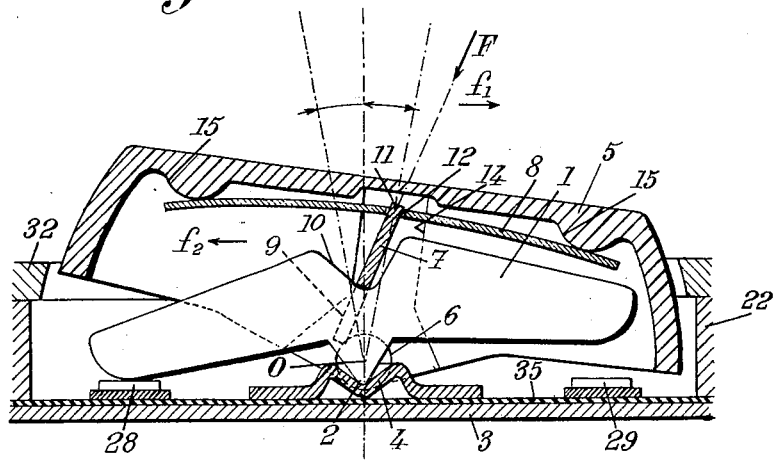
FIG. 4 is a sectional view on an enlarged scale corresponding to a portion of FIG. 1.
Figure 5:
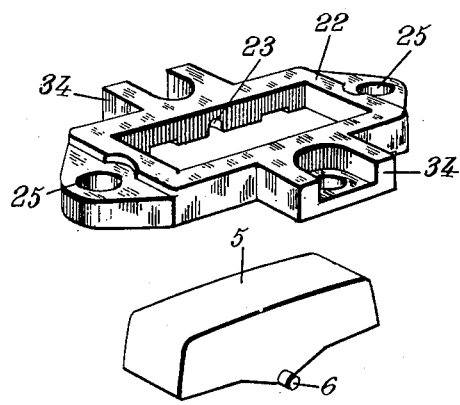
FIG. 5 is a perspective view of some elements of the device before assembly thereof.

Thus, if the means 6 for pivotally mounting the control member in the device are constituted by small trunnions projecting from the sides of said control member, I make use of frame such as 22 provided with an inner rectangular hole with, in the lower face of said frame, notches 23 adapted to accommodate said trunnions 6 (FIGS. 3 and 5).

It will be understood that, after the control member 5 (FIG. 5) has been introduced from below into frame 22, trunnions 6 being engaged into said notches 23, the whole of the apparatus can be assembled by moving the whole of the frame toward the rocking contact and the means for connecting it with the control member, these last mentioned elements being themselves introduced into the frame. The whole is then fixed in this position. FIG. 1 shows at 24 the rings which have served to this fixation and which have been preliminarily introduced into holes 25 (FIG. 5) provided in the frame and the edges of which are bent against the base plate 3.

Figure 2:
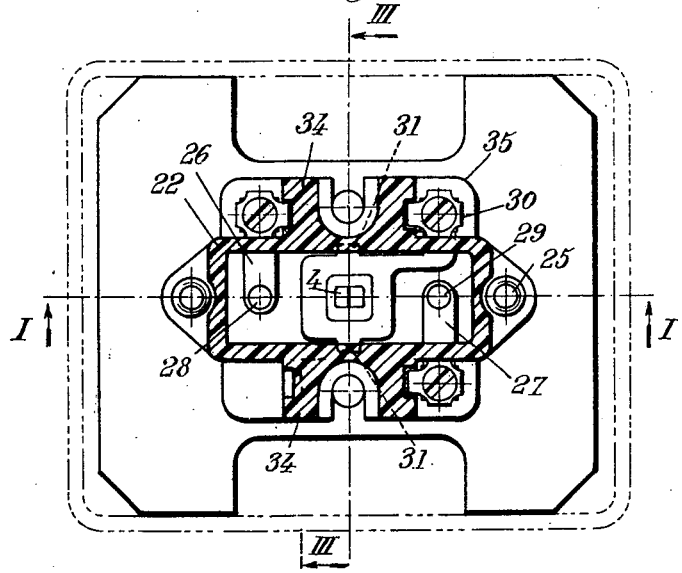
FIG. 2 is a plan view (with parts in section) corresponding to FIG. 1.

Of course this base plate 3 is intended to support the various conducting pieces which serve to establish the electrical connections. In the example of FIGS. 1 to 3, these piece are:

Two end terminals 26, 27 carrying contact studs 28, 29 capable of cooperating with rocking contact 1, And a third terminal 30 which is integral with the central conductor element 4 which constitutes the V-shaped piece adapted to cooperate with the sharp edge 2 of the rocking member.

It should be noted that when assembling the parts, piece 4 is guided by lateral projections 31 (FIG. 3) engaging without substantial play in notches 23.

On the drawings, the switch has been supposed to be of the double contact type, but it should be well understood that if the switch were to be of the single contact type, one of the contacts 28, 29 would be cancelled or constituted by a flexible and resilient piece acting as an abutment for movable contact 1 and capable of attenuating shocks. In a general manner, shocks are reduced by placing on the base plate a lining of flexible material, such as shown at 35 (FIGS. 4 to 9).

The apparatus as above described may be protected by a cover 32 which is fixed for instance by screwing at 33 in rings 24.

Finally, the frame is further provided with lateral projections 34 for fixation of the switch on a wall or the like.

The operation of this switch is such that rocking of the control member in a direction $f_1$ (FIG. 4) produces, by the action of resilient plate 8 and link 7, a swinging of contact 1 in the opposed direction $f_2$. This swinging displacement of contact 1 takes place, under the effect of the resilient force F located in the plane of said link, when the point of contact thereof with the notch 10 of contact 1 passes through the line extending from the pivot center O of control member 5 with respect to base plate 3 to the pivot center of link 7 with respect to control member 5.

The device above described has many advantages, in particular its operation is very safe and its dimensions are small.

According to another feature of the present invention illustrated by FIGS. 12 to 14, the base plate 3, made in any suitable manner (in insulating material, for instance a plastic one), supports the terminals to which lead the conductors of the installation.

For instance, I provide a central terminal 41 connected to plate 1, and in particular rigid with the cup-shaped piece 4 which acts as a support for said piece, and on the other hand two other terminals 42 connected to contacts 40, these terminals being secured in the base plate 3. This plate is fixed to frame 22 by means of screws such as 43.

A plate 3 of this kind can easily be replaced in case of wear of the contacts.

The fixation of such a device in a hole provided in the wall or the like may be made of different manners.

In particular, according to another feature of the invention which may be applied not only to switches but to all articles of the kind in question (in particular to socket arrangements, as shown with reference to FIGS. 16 to 19 or to other devices with reference to FIG. 20), I combine with said articles resilient means, in particular constituted by U-shaped springs capable of exerting a friction upon the walls of the corresponding hole of a supporting plate.

For instance, considering such a plate 44 (FIGS. 14 and 15) provided with a rectangular hole 45 adapted to receive a switch or similar article, this article is provided at both ends with resilient means such as 46, in particular two U-shaped springs, the distance between the two branches of which is a little greater than the width of said hole. When introducing the article into this hole, the branches of said springs are caused to deform toward the position shown in dotted lines on FIG. 15, so that the desired friction effect is obtained.

Said springs 46 are for instance fixed by means of screws 43 such as above described.

Means may be provided to lock the article by means of said springs or the like with respect to plate 44 in the final assembly position (in particular as hereinafter described).

FIGS. 16 to 19 illustrate, in the case of a box for a plug and socket device, other means of the same kind to ensure the fixation of the device in a hole.

Said means include a plate 47 made of an iron sheet suitably cut and bent into U shape so as to obtain a structure analogous to the above described U-shaped springs. The two lateral branches are cut so as to form on the one hand, at the ends, U-shaped structures analogous to those above described, and on the other hand, at the center, a supplementary U-shaped spring 48. The latter may include, at its upper part, a finger 49 adapted to engage in a notch 50 provided in the corresponding lateral edge of the covering plate 44. Shoulders, such as 51, then come to bear under said plate, so as to produce a locking effect.

The device shown by FIGS. 16 to 19 includes the same essential elements, that is to say a frame 22 and a base plate 3 carrying the terminals 42, as the device of FIGS. 3 to 6. Sleeves 52 are integral with terminals 42. A cover 53, provided with holes 54 for the passage of plugs, expands above the sleeves, this cover being kept in position at 55 by frame 22, once this frame and plate 3 have been assembled together by means of screws 43.

FIGS. 20 and 21 illustrate the use that can be made of apparatus of this kind, provided with spring means for assembly and locking purposes.

Such a fixation permits of easily grouping a plurality of apparatus, made of standard dimensions, on the same plate or panel provided with openings themselves of standard dimesions and through which the apparatus can be easily introduced.

FIGS. 20 and 21 show a splitter box 60. The plate 44 which covers this box includes several series of apertures 45, of rectangular shape. The devices above mentioned (such as switches and the like) are introduced through some of these apertures and each of these devices essentially includes a frame 22 and a base plate 3. These devices are fixed in the apertures of box 60 and kept in position by springs 46 of the kind above described.

Plate 44, which constitutes a removable cover, may include label carriers 61 to give the necessary indications concerning the devices. The conductors arrive to the box at 62 and they may lead to a terminal bar 63.

I will now describe several forms of springs 46 of the kind above referred to.

According to an embodiment, I provide on springs 46 projections 64 for locking purposes. These projections may be made in many different ways, for instance in one of those shown by FIGS. 22 to 26, that is to say:

Either in the form of stamped projections, as shown by FIG. 24,

Or in the form of bends as shown by FIG. 25,

Or again in the form of tongues cut from springs, as shown by FIG. 26.

Anyway, once the device 3, 22 has been introduced into the corresponding hole, the springs rub resiliently against the corresponding walls of hole 43, and when said resilient projections have moved past the edges of said walls, they extend so as to exert a locking action which prevents them from being removed too easily.

For eliminating this locking action, it will generally suffice to exert a sufficiently great pull on the device, at least when the resilient means have oblique or inclined surfaces which do not positively prevent extraction.

However it may be advantageous, in some cases, to provide means which enable the operator, by means of a tool, to exert on at least one of the branches of the springs, an effort tending to retract this branch toward the inside of aperture 45, so as to facilitate the passage of projections 64 when it is desired to remove the device.

An arrangement of this kind is shown by FIGS. 22b, 23 and 24. It will be seen that the corresponding branches of spring 46 are provided with small projections 49 capable of extending to the outside of plate 44 when the device is in position. These branches are therefore accessible to the operator. If, as it is generally the case, the device is provided with a shoulder $22_1$ covering the edge of aperture 45, I provide in this shoulder notches 65 which permit of having access to said projections (FIG. 23).

The above mentioned springs may be disposed in such manner as to cooperate with two opposed edges of aperture 45, or they may be arranged so as to cooperate with the four edges of said aperture.

This last mentioned solution is illustrated by FIGS. 27 to 29.

According to this embodiment, I provide for instance at every end of device 3, 22, a group of three spring plates $46_1$, $46_1$, $46_2$ which may be made of a single piece and kept in position as in the other constructions by screws such as 43.

In this case, the projections such as 49 may be provided only on some of the branches of said springs, for instance on branches $46_2$.

It should be further be indicated that projections 64 may themselves be provided on only some of said branches, for instance, in this case, also on branches $46_2$ which are supposed on the drawing to cooperate with the small sides of aperture 45.

FIG. 30 illustrates still another construction where use is made of several spring plates 46, 48 constituted by a single piece, this solution being analogous to that shown by FIGS. 17 to 19. The projections 64 and 49 are provided on the middle branches 48.

It will be seen that the middle branches 48 are carried by longitudinal elements or bars 66, so that the resiliency of said branches 48 is independent of that of the four other branches 46, said resiliency being ensured by deflection of bars 66. But it should be well understood that, contrary to what is shown by the drawings, bars such as 66 may be constituted by a piece which is fixed on the lateral branches 46 by welding, riveting or the like.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An electrical switching device which comprises, in combination, a base plate, at least one contact stud carried by said base plate, a rocking contact structure pivoted with respect to said plate about an axis close to said plate, said rocking contact structure being capable, in one position thereof, of cooperating with said contact stud, a rocking control structure pivoted with respect to said plate about an axis parallel to said first mentioned axis and located close thereto, and a link mounted to cooperate at one end with said rocking contact structure and at the other end with said rocking control structure for snapping said rocking contact structure in one direction or the other in response to rotation of said control structure in one direction or the other at least one of said structures including a resilient part in contact with said link for permitting said snapping action thereof, said link extending between respective points of said structures both at greater distance from said base plate than either of said two axes.

2. An electrical switching device which comprises, in combination, a base plate, at least one contact stud carried by said base plate, a rocking contact pivoted with respect to said plate about an axis close to said plate, said rocking contact being capable, in one position thereof, of cooperating with said contact stud, a rocking control member pivoted with respect to said plate about an axis parallel to said first mentioned axis and located close thereto, a resilient plate movably carried by said control member, and a link interposed between said resilient plate and said rocking contact for snapping said rocking contact in one direction or the other in response to rotation of said control member in one direction or the other.

3. A device according to claim 2 in which said plate extends along said control member.

4. An electrical switching device which comprises, in combination, a base plate, at least one contact stud carried by said base plate, a rocking contact pivoted with respect to said plate about an axis close to said plate, said rocking contact being capable, in one position thereof, of cooperating with said contact stud, a rocking control member pivoted with respect to said plate about an axis parallel to said first mentioned axis and located close thereto, a resilient plate movably carried by said rocking contact, and a link interposed between said resilient plate and said control member for snapping said rocking contact in one direction or the other in response to rotation of said control member in one direction or the other said link extending between respective points of said resilient plate and of said control members both at a greater distance from said base plate than either of said two axes.

5. A device according to claim 1 in which said resilient part is a helical spring.

6. An electrical switching device which comprises, in combination, a frame in the form of a block having two parallel faces provided with a hole extending from one of said faces to the other, said hole being in the form of a prism having its edges at right angles to said faces, the cross-sections of said prismatic hole by planes parallel to said faces being elongated rectangles, said frame being provided in one of said faces with two rectilinear notches in line with each other and parallel to the shorter sides of said rectangular cross-sections, at mid-distance between said shorter sides, said notches opening into said hole, a base plate applied against said face of said frame, a rocking contact piece pivoted to said base plate about an axis adjoining said plate and parallel to said notches, said contact piece being movable inside said hole, a rocking control member also movable in said hole above said contact piece so as to cover it, said control member being provided with trunnions journalled in said notches, resilient means interposed between said rocking control member and said rocking contact piece to snap said contact piece in one direction or the other about said axis according to the direction in which said control member is pivoted, and contact studs carried by said base plate to cooperate with the ends of said rocking contact piece.

7. A device according to claim 1 in which said rocking contact structure is a plate having a bent middle portion forming a pivot edge resting on said base plate along said first mentioned axis and said connecting means include a link plate caught in said bent portion.

8. A device according to claim 1 further including input and output terminals carried by said base plate.

References Cited in the file of this patent

UNITED STATES PATENTS

| | | |
|---|---|---|
| 1,918,282 | Meuer | July 18, 1933 |
| 2,027,538 | Krieger | Jan. 14, 1936 |
| 2,203,555 | Von Hoorn | June 4, 1940 |
| 2,790,867 | Sparr | Apr. 30, 1957 |
| 2,803,728 | Drury | Aug. 20, 1957 |
| 2,806,918 | Lautzenhiser | Sept. 17, 1957 |
| 2,836,687 | Gelzheiser | May 27, 1958 |
| 2,861,142 | Millerwise | Nov. 18, 1958 |
| 2,861,143 | Grover | Nov. 18, 1958 |

FOREIGN PATENTS

| | | |
|---|---|---|
| 539,478 | Belgium | Jan. 2, 1956 |
| 549,324 | Italy | Oct. 12, 1956 |